United States Patent
Simell et al.

(10) Patent No.: US 12,114,659 B2
(45) Date of Patent: Oct. 15, 2024

(54) METHOD FOR CONTROLLING GROWTH OF MICROORGANISMS AND/OR BIOFILMS IN AN INDUSTRIAL PROCESS

(71) Applicants: Kemira Oyj, Helsinki (FI); University of Copenhagen, Copenhagen (DK)

(72) Inventors: Jaakko Simell, Helsinki (FI); Marko Kolari, Vantaa (FI); Michael Givskov, Humlebaek (DK); Tim Tolker-Nielsen, Kgs. Lyngby (DK); Morten Levin Rybtke, Brondby (DK); Jens Bo Andersen, Greve (DK)

(73) Assignees: Kemira Oyj, Helsinki (FI); University of Copenhagen, Copenhagen (DK)

( * ) Notice: Subject to any disclaimer, the term of this patent is extended or adjusted under 35 U.S.C. 154(b) by 35 days.

(21) Appl. No.: 17/873,592

(22) Filed: Jul. 26, 2022

(65) Prior Publication Data

US 2022/0361497 A1 Nov. 17, 2022

Related U.S. Application Data

(62) Division of application No. 16/638,769, filed as application No. PCT/EP2018/073107 on Aug. 28, 2018, now Pat. No. 11,490,621.

(30) Foreign Application Priority Data

Aug. 29, 2017 (EP) ..................... 17188321

(51) Int. Cl.
*A01N 43/78* (2006.01)
*A01N 41/10* (2006.01)

(52) U.S. Cl.
CPC ............. *A01N 43/78* (2013.01); *A01N 41/10* (2013.01)

(58) Field of Classification Search
CPC ............................... A01N 41/10; A01N 43/78
See application file for complete search history.

(56) References Cited

U.S. PATENT DOCUMENTS

| 2,564,430 | A | | 8/1951 | Gillaspie et al. |
| 3,159,532 | A | | 12/1964 | Birium et al. |
| 3,159,666 | A | | 12/1964 | Allen et al. |
| 4,079,148 | A | | 3/1978 | Oeckl et al. |
| 4,420,484 | A | | 12/1983 | Gorman et al. |
| 4,617,328 | A | | 10/1986 | Liu |
| 4,859,702 | A | | 8/1989 | Whitekettle et al. |
| 5,128,051 | A | | 7/1992 | Theis et al. |
| 5,198,453 | A | | 3/1993 | LaZonby et al. |
| 5,324,432 | A | * | 6/1994 | Robertson ............ C02F 3/342 210/764 |
| 5,785,867 | A | | 7/1998 | LaZonby et al. |
| 6,096,225 | A | | 8/2000 | Yang et al. |
| 2004/0157931 | A1 | | 8/2004 | Ra |
| 2005/0147528 | A1 | | 7/2005 | Shim et al. |
| 2006/0008496 | A1 | | 1/2006 | Kulkarni et al. |
| 2011/0177147 | A1 | | 6/2011 | Hunter et al. |
| 2013/0302443 | A1 | | 11/2013 | Janak |
| 2018/0142537 | A1 | | 5/2018 | Baldoni-Andrey et al. |
| 2020/0199818 | A1 | | 6/2020 | Simell et al. |

FOREIGN PATENT DOCUMENTS

| CN | 101239056 A | | 8/2008 |
| CN | 101909437 A | | 12/2010 |
| CN | 102086615 A | | 6/2011 |
| CN | 102803157 A | | 11/2012 |
| CN | 104936448 A | | 9/2015 |
| CN | 105142602 A | | 12/2015 |
| EP | 0055474 | * | 7/1982 |
| EP | 0055474 A1 | | 7/1982 |
| JP | S5195129 A | | 8/1976 |
| JP | S5221321 A | | 2/1977 |
| JP | S57135840 A | | 8/1982 |
| JP | H03137986 A | | 6/1991 |
| JP | H04166288 A | | 6/1992 |
| JP | H07265866 A | | 10/1995 |
| JP | H1135410 A | | 4/1997 |
| JP | H11130610 A | | 5/1999 |
| JP | 2002524257 A | | 8/2002 |
| JP | 2005060351 A | | 3/2005 |
| JP | 2005519089 A | | 6/2005 |
| JP | 2007045715 A | | 2/2007 |
| JP | 2014509253 A | | 4/2014 |
| JP | 2020512793 A | | 4/2020 |
| KR | 19860001884 B1 | | 10/1986 |

(Continued)

OTHER PUBLICATIONS

Klahre et al. (Wat Res. 34, 14, 3657-65, 2000) (Year: 2000).*
Pulp & Paper Canada (https://www.pulpandpapercanada.com/pulping-bleaching-1000143592/, Oct. 1, 2003). (Year: 2003).*
Office Action in Chinese patent application No. 2018800566519, mailed Oct. 15, 2021, 7 pages.
V.G. Belikov, Pharmaceutical Chemistry, training manual, 2007; Moscow, Medpressinform, p. 27-29. With English translation 6p.
G.Dyson, P. May; The Chemistry of Synthetic Drugs, M:Mirs, 1964, p. 12-19. With English translation 16p.
Search report of Federal Service for Intellectual Property for copending Russian application 2020110929. Dated on Oct. 22, 2021. With English translation 4p.
Ekman in view of (AppJ Ind Microbiol Biotechnol, 2007, 34:203-211). (Year: 2007).

(Continued)

*Primary Examiner* — Umamaheswari Ramachandran
(74) *Attorney, Agent, or Firm* — Meunier Carlin & Curfman LLC

(57) ABSTRACT

The invention relates to a method for controlling of a biofilm, for removing a formed biofilm and/or for controlling a growth of microorganisms, preferably bacteria, in an aqueous environment of an industrial manufacturing process comprising cellulosic fibre material. In the method a composition comprising a compound selected from a group consisting of 3-[(4-methylphenyl)sulphonyl]-2-propenenitrile and 4-amino-N-2-thiazolyl-benzenesulphonamide is administered to the aqueous environment of the process.

15 Claims, No Drawings

(56) References Cited

FOREIGN PATENT DOCUMENTS

| | | | |
|---|---|---|---|
| RU | 2405080 | C2 | 11/2010 |
| WO | 9409209 | A1 | 4/1994 |
| WO | 9944424 | A1 | 9/1999 |
| WO | 2007125154 | A1 | 11/2007 |
| WO | 2008146594 | A1 | 12/2008 |
| WO | 2009045638 | A2 | 4/2009 |
| WO | 2009138888 | A2 | 11/2009 |
| WO | 2009143511 | A1 | 11/2009 |
| WO | 2012025228 | A1 | 3/2012 |
| WO | 2013045638 | A1 | 4/2013 |
| WO | 2014114851 | A1 | 7/2014 |
| WO | 2016059153 | A1 | 4/2016 |

OTHER PUBLICATIONS

Smook, Gary A., Handbook for Pulp and Paper Technologists, 2nd ed, Angus Wilde Publications, 1992, pp. 4-6, 207-208, 220 (Year: 1992).

Non-Final Office Action of pending U.S. Appl. No. 16/640,069, mailed May 4, 2022, 12 pages.

English translation of Notice of Reasons for Rejection in JP Application No. 2020-512793 (corresponding to U.S. Appl. No. 16/640,069) mailed May 4, 2022, 4 pages.

Ekman J., "Detection and quantitation of colored deposit-forming *Meiothermys* spp. in paper industry processes and end products," Journal of Industrial Microbiology & Biotechnology, 2007, 34:203-211), Nov. 28, 2006.

Desjardins E, et al., "Identification of bacteria contaminating pulp and a paper machine in Canadian paper mill," Journal of Industrial Microbiology & Biotechnology 30:141-145, Jan. 14, 2003.

Peltola M, et al., "Effects of polarization in the presence and absence of biocides on biofilms in a simulated paper machine water," J Ind Microbiol. Biotechnol. 38:1719-1727, Apr. 2, 2011.

Machine translation of Notice of reasons for refusal issued by Japanese Patent Office on corresponding application JP2020-512798. Date of office action Jun. 10, 2022.

Notice of allowance of corresponding Korean application No. 10-2020-7008965; Issued on Oct. 5, 2023, 3 pages.

Office action issued on May 16, 2023 by the Korean Patent Office in corresponding application 10-2020-7008965. Machine translation included. 13p.

Notice of allowance of corresponding Korean application No. 10-2020-7008968; Issued on Oct. 5, 2023, 3 pages.

Office Action issued in the Brazilian Application No. BR112020003504-1, mailed Jun. 25, 2024 (10 pages).

\* cited by examiner

METHOD FOR CONTROLLING GROWTH OF MICROORGANISMS AND/OR BIOFILMS IN AN INDUSTRIAL PROCESS

FIELD OF INVENTION

The present invention relates to a method for controlling growth of microorganisms and/or biofilms in an industrial process according to the preamble of the enclosed independent claim.

BACKGROUND OF THE INVENTION

Microorganisms are present in most of the industrial processes. Their presence is especially cumbersome in processes which are water intensive, such as manufacture of pulp, paper, board or the like. Microorganisms thrive when the process water contains biodegradable dissolved substances, and the temperature and pH of the process water are favourable for microbial life. Microorganisms may enter the process through contamination from air, incoming raw water and/or non-sterile raw materials. If no countermeasures are taken, microorganisms may cause extensive problems in a process, such as papermaking. Problems related to microorganisms include, for example, decomposition of chemical additives, detrimental change in process pH, formation of malodorous or toxic compounds, and/or biofilm formation on surfaces.

In manufacture of paper and board the problems may lead to defects, such as spots and holes, in the formed web, or even to web breaks and machine stops, for example when slime slumps are sloughing off. In a pulp, paper or board mill uncontrolled microbial growth could thus cause problems and there is a need for effective microbial control treatment. However, only limited number of antimicrobial agents demonstrates good biocidal performance at the process conditions prevailing in a paper or board manufacture, e.g., high content of cellulosic fibre material, high temperature, high flow rates and high oxidizer demand. Furthermore, in these processes the microorganisms, mainly bacteria, are continuously present and may be introduced in the middle of the continuous process. Due to the process conditions the conventional biocides, which are used in pulp, paper and board industry are different from common antimicrobial agents used in other industries, e.g., food industry or in agriculture. For example, in food industry the environment is sterilized in the beginning whereafter the production continues under sterile conditions and sterile raw materials. These conditions are very different from the non-sterile conditions prevailing in an open paper or board production process. Especially important in processes comprising cellulosic fibre material, such as pulp, paper and board manufacture, is the effective control of biofilm on the process surfaces. Biofilm formation is still a frequent problem in manufacture of paper and board, despite the regular use of common biocides in the recirculating water flows. There is a need to improve efficacy of biofilm control under conditions of pulp, paper and board making processes.

SUMMARY OF THE INVENTION

An object of this invention is to minimise or possibly even eliminate the disadvantages existing in the prior art.

Another object of the present invention is to provide a method which makes it possible to effectively control biofilms with a low dosage in an industrial manufacturing process comprising cellulosic fibre material, for example, in pulp, paper or board manufacture.

An object of the present invention is to provide a method which makes it possible to effectively prevent, inhibit and/or reduce biofilm growth with a low dosage in an industrial manufacturing process comprising cellulosic fibre material, for example, in pulp, paper or board manufacture.

An object of the present invention is to provide a method which makes it possible to effectively control the growth of microorganisms in an industrial manufacturing process comprising cellulosic fibre material, for example, in pulp, paper or board manufacture.

Yet another object of the present invention is to provide simple and effective method for industrial biofilm control at high temperatures, especially in aqueous process conditions with high cellulosic fibre content and/or at least locally high shear forces and/or high flow rates.

These objects are attained with the invention having the characteristics presented below in the characterising parts of the independent claims.

Some preferred embodiments of the invention are presented in the dependent claims.

The embodiments mentioned in this text relate, where applicable, to all aspects of the invention, even if this is not always separately mentioned.

In a typical method according to the present invention for controlling biofilm and/or for removing of a formed biofilm and/or for controlling a growth of microorganisms, preferably bacteria, in an aqueous environment of an industrial manufacturing process comprising cellulosic fibre material, by administering to the aqueous environment of the process a composition comprising a compound selected from group consisting of 3-[(4-methylphenyl)sulphonyl]-2-propenenitrile and 4-amino-N-2-thiazolyl-benzenesulphonamide.

Now it has been found that the compounds selected from 3-[(4-methylphenyl)sulphonyl]-2-propenenitrile or 4-amino-N-2-thiazolyl-benzenesulphonamide are highly effective in controlling the formation of biofilm and/or growth of microorganisms, in an aqueous environment of an industrial manufacturing process comprising cellulosic fibre material, especially in paper, board and pulp manufacture. The obtained effect is good even at low dosage of the compound and in aqueous environments having high flow rate and/or high temperature. It was unexpected that the compounds would show antimicrobial performance that is as good as or even better than the conventional antimicrobial agents used in pulp and paper industry against biofilms. The compositions of the invention are useful in providing an anti-bacterial effect and controlling the growth of biofilm and/or bacteria.

In the present context of the term "controlling of biofilm growth" encompasses control actions selected at least from preventing, inhibiting and/or reducing of biofilm. These control actions may take place before, during or after biofilm formation and the control actions may take place separately or simultaneously, for example compositions comprising said compounds may both prevent formation of new biofilm and simultaneously reduce the existing biofilm. The compounds may be useful in preventing of biofilm. This means that the compounds prevent formation of biofilm on bio-film free process surfaces. The compounds may also be useful in inhibiting of biofilm. This means that the compounds inhibit further growth of existing biofilm and/or inhibit formation of biofilm on a biofilm free process surface. The compounds may further be useful in reducing the biofilm. This means that the compounds reduce the amount of existing biofilm on the process surfaces. In general, control of biofilm growth may be achieved by controlling the amount of microorganisms in the process and/or by controlling their growth in biofilm mode. The composition comprising said compounds may be useful in controlling the growth of microorganisms, either in biofilm and/or free in the aqueous environment of an industrial manufacturing process comprising cellulosic fibre material, preferably in biofilm.

In the present context the term "biofilm" is understood as a community of microorganisms, typically bacteria, which adheres to a process surface and usually grows surrounded by a complex matrix of extra polymeric substances. The biofilm protects the microorganisms, which makes the control of biofilm growth more challenging than control of growth of free microorganisms. Ineffective biofilm control may cause significant issues in industrial processes, for example in form of increased cleaning need, production stops and/or deterioration of production quality and/or quantity.

In the present context the term "controlling of the growth of the microorganisms" refers to eliminating and/or reducing of the amount and/or activity of microorganisms and the term is synonymous to any biostatic or biocidal effect, such as killing, preventing, removing, or inhibiting the growth of microorganisms. The microorganisms may be present in free form in the aqueous environment or in a form of a biofilm, known also as biofilm mode of growth In the present context the term "aqueous environment" refers to an industrial water system, containing aqueous solution. The present invention relates especially to industrial processes having an aqueous environment comprising cellulosic fibre material of natural origin.

According to one embodiment of the invention the temperature of the aqueous environment is at least 40° C., preferably at least 50° C.

Especially the composition of the present invention is suitable for administering or use in industrial manufacturing processes comprising cellulosic fibre material, such as manufacture of paper, board, pulp, tissue, moulded pulp, non-woven, viscose or the like. The aqueous environment comprises preferably at least water, cellulosic fibre material, fines and/or fibre fragments of natural origin. The aqueous environment may also comprise starch. The cellulosic fibre material preferably originates from softwood, hardwood or non-wood sources, such as bamboo or kenaf, or any mixtures thereof. Preferably the cellulosic fibre material originates from lignocellulosic fibre material. More preferably the cellulosic fibre material is lignocellulosic fibres. The cellulosic fibre material may originate from any suitable mechanical, chemi-mechanical or chemical pulping process or any of their combinations or any other suitable pulping process known as such. The cellulosic fibre material may also comprise fibre material which originates from recycled board, paper or pulp. For example, the cellulosic fibre material may comprise cellulosic fibres that originate from hardwood and have a length of 0.5-1.5 mm and/or from softwood and have a length of 2.5-7.5 mm. The aqueous environment may also comprise inorganic mineral particles, such as fillers and/or coating minerals; hemicelluloses; lignin; and/or dissolved and colloidal substances. The aqueous environment may also comprise papermaking additives, such as starch, sizing agents, inorganic or organic coagulation or flocculation agents, natural or synthetic polymers of different length and/or charge, dyes, optical brighteners, or any combination thereof.

The composition may comprise the compound 3-[(4-methylphenyl)sulphonyl]-2-propenenitrile in form of a Z- or E-isomer, or the composition may comprise a mixture of both isomers. For example, the ratio of E to Z isomers in the composition may be from 70:30 to 100:0 or from 80:20 to 99:1. Alternatively the ratio of E to Z isomers in the composition may be from 30:70 to 0:100 or from 20:80 to 1:99

According to one embodiment of the invention it is possible to administer to the industrial manufacturing processes comprising cellulosic fibre material a composition comprising one or both of the compounds selected from 3-[(4-methylphenyl)sulphonyl]-2-propenenitrile and 4-amino-N-2-thiazolyl-benzenesulphonamide. In case both compounds are administered to the aqueous environment, they may be administered as one composition, i.e., a mixture, or they may be administered as two different compositions successively after each other. In case both compounds are administered, the individual dosages for both compounds may be the same or different from each other. In this manner it is possible to effectively control the biofilm and/or microorganisms in the aqueous environment.

The present invention is suitable for controlling the growth of microorganisms, such as bacteria, belonging to genus of *Meiothermus, Deinococcus* and/or *Pseudoxanthomonas* in the aqueous environment. According to one embodiment of the invention the aqueous environment of the industrial manufacturing process comprising cellulosic fibre material thus comprises bacteria belonging to genus of *Meiothermus, Deinococcus* and/or *Pseudoxanthomonas*, either alone or in any combination, or the aqueous environment is in contact with a biofilm at least partially formed by any of the said bacteria. The microorganisms in the said industrial processes are typically not photosynthetic microorganisms, i.e., preferably the aqueous environment is almost or completely free of photosynthetic microorganisms, e.g. algae. Addition of the compound selected from 3-[(4-methylphenyl)sulphonyl]-2-propenenitrile or 4-amino-N-2-thiazolyl-benzenesulphonamide reduces the amount of the said microorganisms, either in free form or as biofilm, or even eliminates their presence in the aqueous environment completely. The elimination may be total or partial. The prevention refers here to any preventive eliminating action which reduces or inhibits the growth of the microorganisms in biofilm mode and thereby totally or partially prevents the formation of the biofilm.

In general, the composition comprising the compound selected from 3-[(4-methylphenyl)-sulphonyl]-2-propenenitrile or 4-amino-N-2-thiazolyl-benzenesulphonamide may be added to the aqueous environment in biostatic or biocidal amounts. Biostatic amount refers to an amount sufficient to at least prevent and/or inhibit the activity and/or growth of the microorganisms or the biofilm. Biocidal amount refers to more effective activity, such as to an amount capable of reducing the activity and/or growth of the microorganisms or the biofilm and/or killing most or all of the microorganisms present in the aqueous environment. According to one embodiment of the invention the compound may be added to the aqueous environment in dosage amount of 0.01-100 ppm, preferably 0.01-10 ppm, more preferably 0.01-2 ppm or 0.01-1 ppm, even more preferably 0.01-0.5 ppm or 0.01-0.3 ppm, calculated as active ingredient, i.e., 3-[(4-methylphenyl)sulphonyl]-2-propenenitrile and/or 4-amino-N-2-thiazolyl-benzenesulphonamide. The effectiveness of the compound enables the use of low dosages and low concentrations while maintaining good control of microorganisms growth and biofilm formation and/or growth.

Compositions comprising compounds selected from 3-[(4-methylphenyl)sulphonyl]-2-propenenitrile or 4-amino-N-2-thiazolyl-benzenesulphonamide may be added to the aqueous environment as a solid, such as dry powder, or more preferably in a liquid form. Compounds may be dosed continuously or periodically. According to one embodiment of the invention the compounds may be administered periodically in the aqueous environment for 3-45 minutes for 6-24 times a day, preferably for 10-30 minutes for 12-24 times a day.

According to one embodiment of the invention the industrial manufacturing process having an aqueous environment comprising cellulosic fibre material of natural origin is pulp and/or paper and/or board manufacturing process, where the aqueous environment shows high temperature and/or high flow rate. The compound selected from 3-[(4-methylphenyl)sulphonyl]-2-propenenitrile or 4-amino-N-2-thiazolyl-benzenesulphonamide is thus added or dosed to a pulp and/or paper and/or board manufacturing system. The aqueous environments in these processes often show high flow and high shear rates, which may induce the formation of biofilm on the process surfaces due to the stress of microorganisms. For example, paper and board making environments the flow rates may typically be higher than 1 m/s, even over 10 m/s, typically from 1 to 20 m/s or from 1 to 10 m/s. It has been observed that the compositions comprising the said compounds are effective especially in these demanding conditions, and it may be generally used throughout the whole process in order to reduce and/or to prevent the growth of microorganisms and the formation of biofilm on the process surfaces. In principle, compositions comprising said compounds may be added at almost any point in the process, especially into process with recirculated process water to maintain the control of microorganisms and/or biofilm formation throughout the process. The compositions comprising the said compounds may also or alternatively be added to the cellulosic fibre material, e.g., lignocellulosic fibre material, which is used as a raw material in the process.

The industrial manufacturing process having an aqueous environment comprising cellulosic fibre material of natural origin may be pulp and/or paper and/or board manufacturing process, where the pH of the aqueous environment is in the range 5-9, preferably 7-8.5.

According to one preferable embodiment of the present invention the compound selected from 3-[(4-methylphenyl)sulphonyl]-2-propenenitrile or 4-amino-N-2-thiazolyl-benzenesulphonamide may be added in the industrial manufacturing process having an aqueous environment comprising cellulosic fibre material, which is paper and/or board manufacturing process, especially in a short loop of the paper or board making process. In a typical paper and board making process, pulp stock is passed into a headbox, which distributes the pulp stock onto a moving wire in a forming section, on which the continuous paper web is formed. The short loop or short circulation section of a paper/board machine is here understood, as customary in the art, the part of the manufacturing system that re-circulates and recycles at least a part of excess water from the pulp stock, collected in a wire pit in the forming section, back to the headbox for re-use.

Alternatively, or in addition, the compound selected from 3-[(4-methylphenyl)sulphonyl]-2-propenenitrile or 4-amino-N-2-thiazolyl-benzenesulphonamide may be added in the industrial manufacturing process having an aqueous environment comprising cellulosic fibre material, e.g. pulp and/or paper and/or board manufacturing process, to process water storage towers, such as circulating water towers and filtrate water towers; to clear or cloudy filtrate storage tanks; pulpers; aqueous streams upstream/downstream of the pulpers; broke system and aqueous process streams upstream/downstream of vessels therein; wire pit process streams upstream/downstream of the pit; paper machine blend chest process streams up-stream/downstream of the chest; fresh water tank; warm water tank and/or shower water tank.

Alternatively, or in addition, the compound selected from 3-[(4-methylphenyl)sulphonyl]-2-propenenitrile or 4-amino-N-2-thiazolyl-benzenesulphonamide may be added in the industrial manufacturing process having an aqueous environment comprising cellulosic fibre material, which is paper and/or board manufacturing process, to any location in a long loop of the paper or board making process. The long loop or long circulation section of a paper/board machine is here understood, as customary in the art, the part of the manufacturing system that handles excess water and broke. Major part of the recovered water exit the short loop and is pumped to long loop, which includes: save-all for capturing useful fibres from the recovered water for reuse, storage tanks for filtrate water used for example in machine showers, and storage tanks for recirculated water used for example as dilution water for importing pulp from pulp mill to paper/board machine. A part of the long loop is the broke system for handling of wet and dry paper rejects from the machine. This material is repulped and reused as a part of the pulp stock.

According to one embodiment the compound selected from 3-[(4-methylphenyl)sulphonyl]-2-propenenitrile or 4-amino-N-2-thiazolyl-benzenesulphonamide is added to aqueous environment, which comprises a residual of peroxide from about 0.01 to about 100 ppm or from about 0.01 to about 50 ppm.

According to one embodiment of the invention the compound selected from 3-[(4-methylphenyl)sulphonyl]-2-propenenitrile or 4-amino-N-2-thiazolyl-benzenesulphonamide may be used in combination with other biocidal or antimicrobial agents. Suitable other biocidal or antimicrobial agents can be non-oxidizing biocidal or antimicrobial agents, or oxidizing biocidal or antimicrobial agents. Suitable non-oxidizing biocidal or antimicrobial agents are, for example, glutaraldehyde, 2,2-dibromo-3-nitrilopropionamide (DBNPA), 2-bromo-2-nitropropane-1,3-diol (Bronopol), quaternary ammonium compounds, carbamates, 5-chloro-2-methyl-4-isothiazolin-3-one (CMIT), and 2-methyl-4-isothiazolin-3-one (MIT). Suitable oxidizing biocidal or antimicrobial agents are, for example, chlorine, salts of hypochlorite, hypochlorous acid, chlorinated isocyanurates, bromine, salts of hypobromite, hypobromous acid, bromine chloride, chlorine dioxide, ozone, hydrogen peroxide, and peroxy compounds, such as peracetic acid or performic acid. Other suitable oxidizing biocidal agents are, for example, stabilized halogen compounds wherein active halogen, such as chlorine or bromine is reacted with a nitrogenous compound, such as dimethylhydantontoin, an ammonium salt, urea, carbamate, or another nitrogen containing molecule capable of reacting with active halogen. For example, in one embodiment the compound selected from 3-[(4-methylphenyl)sulphonyl]-2-propenenitrile or 4-amino-N-2-thiazolyl-benzenesulphonamide is added to aqueous environment, which comprises a residual of active halogen in the range from about 0.01 to about 20 ppm, given as active chlorine.

DETAILED DESCRIPTION OF THE INVENTION

Some embodiments of the invention are described more closely in the following non-limiting examples.

Materials and Methods Used in the Examples

Pure cultures of *Meiothermus silvanus*, a microbe species commonly found in paper machine biofilms (Ekman J, Journal of Industrial Microbiology & Biotechnology 34:203-211) and *Pseudoxanthomonas taiwanensis*, another species commonly found in paper machine environments (Desjardins, E & Beaulieu, C, Journal of Industrial Microbiology & Biotechnology 30:141-145) were used to study the efficacy of various chemicals to prevent biofilm formation.

Biofilm tests were done in either synthetic commercial R2-broth (Lab M Ltd, UK) or fibre-containing synthetic paper machine water, SPW (prepared according to Peltola et al., J. Ind. Microbiol. Biotechnol. 2011, 38: 1719-1727) using 96-microwell plate wells with peg lids (Thermo Fischer Scientific Inc., USA). Plates were incubated at 45° C. with a rotary shaking (150 rpm) providing high flow in each well.

3-[(4-methylphenyl)sulfonyl]-2-propenenitrile, hereinafter called Compound A, was obtained from EMD Biosciences Inc, USA; purity ≥98% E-isomer.

4-amino-N-2-thiazolyl-benzenesulphonamide, hereinafter called Compound B, was obtained from Sigma Aldrich Finland Oy.

2,2-dibromo-3-nitrilopropionamide, hereinafter called DBNPA, was obtained from Kemira Oyj (Fennosan R20, 20% active ingredient).

Test Method for Prevention of Biofilm Formation

For experiments of preventing biofilm formation wells of 96-microwell plates with peg-lids were filled with R2-broth or SPW, inoculated with the pure bacterial cultures and treated with different amounts of chemical compounds to be tested. Peg-lid was put on. After 24 hours the wells were emptied and a fresh solution of pure culture containing SPW or R2 broth with different amounts of test chemicals were added to the wells and the original peg-lid was put back in place. After an additional 24 hours, i.e., 48 hours after starting the test, the wells were emptied, rinsed and the peg lid and wells were left to dry.

Test Method for Removal of Existing Biofilm

For experiments of removing already existing (preformed) biofilm wells of 96-microwell plates with peg-lids were filled with SPW, inoculated with the pure bacterial cultures. Biofilm was grown for 24 hours without addition of any chemical compound to be tested. In some experiments after 24 hours the procedure was repeated by emptying the wells and by addition of a fresh solution of SPW inoculated with pure bacterial culture, again without any test chemical compound. The original peg-lid was put back in place and biofilm was allowed to grow for additional 24 h, i.e., in total 48 h.

After 24 or 48 hours after starting the test, the wells were emptied and a fresh solution of SPW, inoculated with the pure bacterial cultures and with different amounts of chemical compounds to be tested were added and the original peg-lid was placed back in place. After an additional 2 or 24 hours the wells were emptied, rinsed and the peg lid and wells were left to dry.

Quantification of Formed Biofilm

The amount of biofilm formed on the microwells, and peg surfaces was quantified with a staining solution by adding 200 μl of 1% Crystal Violet (Merck Millipore KGaA, Germany) in methanol to each well and placing the peg-lid back on. After 3 minutes the wells were emptied, and the wells and pegs were rinsed 3 times with tap water. The attached Crystal Violet was dissolved into ethanol and the absorbance at 595 nm was measured. The values shown in the following tables are average absorbance from 8 replicate wells and pegs.

All absorbance values in Examples 1-6 are given actual measured values. In calculation for biofilm reduction percentages it was taken in account that the SPW alone for 2 days without any bacterial inoculum gave a background value of 0.14.

Example 1

Tables 1 and 2 demonstrate the ability of Compound A to prevent biofilm formation of *Meiothermus silvanus* and *Pseudoxanthomonas taiwanensis*. Test conditions simulated paper or board making process conditions (synthetic paper machine water, high temperature, fibres present, high flow) and Compound A was observed to control biofilms at a very low concentration. Already a dosage of 0.13 mg/l active Compound A gave over 90% biofilm reduction effect. For comparison, the conventional antimicrobial agent DBNPA required a dosage of 1 mg/l active compound to reach same biofilm reduction efficacy. The results for DBNPA are given in Tables 3 and 4.

Table 1 shows the effect of Compound A dosing to *Meiothermus silvanus* biofilms in SPW at 45° C. and 150 rpm (high mixing). Biofilm was stained and quantified by absorbance measurement. Dosage given as active ingredient.

TABLE 1

| Dosage of Compound A | Biofilm quantity after 48 h contact time | |
|---|---|---|
| [mg/l] | Abs. at 595 nm | Biofilm reduction [%] |
| 0 | 0.98 | — |
| 0.01 | 0.80 | 21.4 |
| 0.03 | 0.75 | 27.4 |
| 0.08 | 0.58 | 47.6 |
| 0.13 | 0.22 | 90.5 |
| 0.20 | 0.15 | 98.8 |

Table 2 shows the effect of Compound A dosing to *Pseudoxanthomonas taiwanensis* biofilms in SPW at 45° C. and 150 rpm (high mixing). Biofilm was stained and quantified by absorbance measurement. Dosage given as active ingredient.

TABLE 2

| Dosage of Compound A | Biofilm quantity after 48 h contact time | |
|---|---|---|
| [mg/l] | Abs. at 595 nm | Biofilm reduction [%] |
| 0 | 1.48 | — |
| 0.01 | 1.42 | 4.5 |
| 0.03 | 1.26 | 16.4 |
| 0.08 | 0.88 | 44.8 |
| 0.13 | 0.55 | 69.4 |
| 0.20 | 0.39 | 81.3 |

Table 3 shows the effect of DPNPA dosing to *Meiothermus silvanus* biofilms in SPW at 45° C. and 150 rpm (high mixing). Biofilm was stained and quantified by absorbance measurement. Dosage given as active ingredient.

TABLE 3

| Dosage of DBNPA | Biofilm quantity after 48 h contact time | |
|---|---|---|
| [mg/l] | Abs. at 595 nm | Biofilm reduction [%] |
| 0 | 0.66 | — |
| 0.2 | 0.57 | 16.9 |
| 0.6 | 0.35 | 60.7 |
| 1 | 0.15 | 98.8 |

Table 4 shows the effect of DPNPA dosing to *Pseudoxanthomonas taiwanensis* biofilms in SPW at 45° C. and 150 rpm (high mixing). Biofilm was stained and quantified by absorbance measurement. Dosage given as active ingredient.

TABLE 4

| Dosage of DBNPA | Biofilm quantity after 48 h contact time | |
|---|---|---|
| [mg/l] | Abs. at 595 nm | Biofilm reduction, [%] |
| 0 | 1.65 | — |
| 0.2 | 1.46 | 12.6 |
| 0.6 | 1.23 | 27.8 |
| 1 | 0.14 | 99.9 |

Results in Tables 1-4 demonstrate that Compound A is capable to prevent biofilm formation of dominant industrial biofilm-formers under paper machine conditions at a very low dosage when compared to conventional biocide used in paper industry.

Example 2 (Reference)

Tables 5 and 6 show effect of a well-known antibiotic Gramicidin against biofilm formation of *Meiothermus silvanus* and *Pseudoxanthomonas taiwanensis*. In a synthetic growth medium R2-broth Gramicidin was capable to prevent biofilm formation at clearly lower concentration than in conditions simulating paper or board making process (synthetic paper machine water, high temperature, fibres present, high flow).

The results in Table 5 and 6 demonstrate expected behaviour of a clinical antimicrobial compound with deteriorating performance when exposed to non-clinical conditions. In contrary, Compound A was capable to control biofilms in paper machine water at a very low concentration as shown in Example 1.

Table 5 shows the effect of Gramicidin dosing to *Meiothermus silvanus* biofilms in R2-broth and SPW. Biofilm was stained and quantified by absorbance measurement. Dosage given as active ingredient.

TABLE 5

| Dosage of Gramicidin [mg/l] | Biofilm quantity after 48 h contact time in R2-broth | | Biofilm quantity after 48 h contact time in SPW | |
|---|---|---|---|---|
| | Abs. at 595 nm | Biofilm reduction, [%] | Abs. at 595 nm | Biofilm reduction, [%] |
| 0 | 1.60 | — | 1.36 | — |
| 0.2 | 1.40 | 13.7 | 1.33 | 2.5 |
| 1 | 0.66 | 64.4 | 1.41 | −4.1 |
| 3 | 0.17 | 97.9 | 0.45 | 74.6 |
| 10 | 0.14 | 100.0 | 0.19 | 95.9 |

Table 6 shows the effect of Gramicidin dosing to *Pseudoxanthomonas taiwanensis* biofilms in R2-broth and SPW. Biofilm was stained and quantified by absorbance measurement. Dosage given as active ingredient.

TABLE 6

| Dosage of Gramicidin [mg/l] | Biofilm quantity after 48 h contact time in R2-broth | | Biofilm quantity after 48 h contact time in SPW | |
|---|---|---|---|---|
| | Abs. at 595 nm | Biofilm reduction, [%] | Abs at 595 nm | Biofilm reduction, [%] |
| 0 | 2.78 | — | 2.37 | — |
| 3 | 2.80 | −0.8 | 2.25 | 5.4 |
| 10 | 2.55 | 8.7 | 2.41 | −1.8 |
| 25 | 0.19 | 98.1 | 2.42 | −2.2 |

Example 3

Tables 7 and 8 demonstrate the ability of Compound B to prevent biofilm formation of *Meiothermus silvanus* and *Pseudoxanthomonas taiwanensis*. Test conditions are identical to test conditions of Example 1.

Table 7 shows the effect of Compound B dosing to *Meiothermus silvanus* biofilms in SPW at 45° C. and 150 rpm (high mixing). Biofilm was stained and quantified by absorbance measurement. Dosage given as active ingredient.

TABLE 7

| Dosage of Compound B | Biofilm quantity after 48 h contact time | |
|---|---|---|
| [mg/l] | Abs. at 595 nm | Biofilm reduction [%] |
| 0 | 0.88 | — |
| 0.1 | 0.62 | 34.4 |
| 0.25 | 0.18 | 94.0 |
| 1 | 0.15 | 99.1 |
| 3 | 0.16 | 97.9 |
| 10 | 0.18 | 94.0 |

Table 8 shows the effect of Compound B dosing to *Pseudoxanthomonas taiwanensis* biofilms in SPW at 45° C. and 150 rpm (high mixing). Biofilm was stained and quantified by absorbance measurement. Dosage given as active ingredient.

TABLE 8

| Dosage of Compound B | Biofilm quantity after 48 h contact time | |
|---|---|---|
| [mg/l] | Abs. at 595 nm | Biofilm reduction [%] |
| 0 | 2.41 | — |
| 0.25 | 2.35 | 2.6 |
| 1 | 2.04 | 16.3 |
| 3 | 0.84 | 69.3 |
| 10 | 0.54 | 82.4 |

Results in Tables 7 and 8 demonstrate that Compound B can prevent biofilm formation of dominant industrial biofilm-formers under paper machine conditions.

Example 4

Tables 9 and 10 demonstrate the ability of Compound A to remove already formed biofilm of *Meiothermus silvanus* and *Pseudoxanthomonas taiwanensis*. Test conditions simulated paper making process conditions (synthetic paper machine water, high temperature, fibres present, high flow). Compound A was observed to remove already formed biofilms. A single dosage of 0.5 mg/l active compound removed all of the biofilm formed during the 48-hour pre-growth time in 24 hours after addition of Compound A.

Table 9 shows the effect of Compound A dosage to *Pseudoxanthomonas taiwanensis* biofilms in SPW at 45° C. and 150 rpm (high mixing). Biofilm was pre-grown for 48 h after which Compound A was added in given amount. After 24 hours the biofilm was stained and quantified by absorbance measurement. Compound A dosage is given as active compound.

TABLE 9

| Dosage of Compound A | Biofilm quantity after 48 h pre-growth and 24 h contact time | |
|---|---|---|
| [mg/l] | Abs. at 595 nm | Biofilm reduction [%] |
| 0 | 2.48 | — |
| 0.2 | 1.73 | 32.2 |
| 0.5 | 0.13 | 100.2 |

Table 10 shows the effect of Compound A dosing to *Meiothermus silvanus* biofilms in SPW at 45° C. and 150 rpm (high mixing). Biofilm was pre-grown for 48 h after which Compound A was added in given amount. After 2 hours the biofilm was stained and quantified by absorbance measurement. Compound A dosage is given as active compound.

TABLE 10

| Dosage of Compound A | Biofilm quantity after 48 h pre-growth and 2 h contact time | |
|---|---|---|
| [mg/l] | Abs. at 595 nm | Biofilm reduction [%] |
| 0 | 1.30 | — |
| 0.5 | 1.20 | 8.0 |
| 1 | 1.11 | 16.3 |
| 2 | 0.99 | 26.6 |

Example 5

Compound A was obtained and its E- and Z-isomers were separated from each other. Tables 11 and 12 demonstrate the ability of E- and Z-isomers of Compound A to prevent biofilm formation of *Meiothermus silvanus* and *Pseudoxanthomonas taiwanensis*. Test conditions are identical to test conditions of Example 1. It is seen that both isomers of Compound A prevent biofilm formation.

Table 11 shows the effect of E- and Z-isomers of Compound A to *Meiothermus silvanus* biofilms in SPW at 45° C. and 150 rpm (high mixing). Biofilm was stained and quantified by absorbance measurement. Compound A dosage is given as active compound.

TABLE 11

| Dosage of Compound A | Biofilm quantity after 48 h contact time, E-isomer | | Biofilm quantity after 48 h contact time Z-isomer | |
|---|---|---|---|---|
| [mg/l] | Abs. at 595 nm | Biofilm reduction [%] | Abs. at 595 nm | Biofilm reduction [%] |
| 0 | 1.52 | — | 1.52 | — |
| 0.1 | 0.40 | 88.9 | 0.16 | 99.1 |
| 0.2 | 0.16 | 99.3 | 0.15 | 99.4 |

Table 12 shows the effect of E- and Z-isomers of Compound A to *Pseudoxanthomonas taiwanensis* biofilms in SPW at 45° C. and 150 rpm (high mixing). Biofilm was stained and quantified by absorbance measurement. Compound A dosage is given as active compound.

TABLE 12

| Dosage of Compound A | Biofilm quantity after 48 h contact time, E-isomer | | Biofilm quantity after 48 h contact time, Z-isomer | |
|---|---|---|---|---|
| [mg/l] | Abs. at 595 nm | Biofilm reduction [%] | Abs. at 595 nm | Biofilm reduction [%] |
| 0 | 1.46 | — | 1.46 | — |
| 0.1 | 0.36 | 90.6 | 0.16 | 99.3 |
| 0.2 | 0.16 | 99.1 | 0.16 | 99.3 |

Example 6

Compound A was obtained and its E- and Z-isomers were separated from each other. Table 13 demonstrates the ability E- and Z-isomers of Compound A to remove already formed biofilms of *Meiothermus silvanus* and *Pseudoxanthomonas taiwanensis*. Test conditions simulated paper making process conditions (synthetic paper machine water, high temperature, fibres present, high flow). It is seen that both isomers of Compound A are effective in removing of already formed biofilms.

Table 13 shows the effect of E- and Z-isomers of Compound A to *Meiothermus silvanus* biofilms in SPW at 45° C. and 150 rpm (high mixing). Biofilm was pre-grown for 24 h after E- or Z-isomer of Compound A was added in amount indicated. After 24 hours the biofilm was stained and quantified by absorbance measurement. Compound A dosage is given as active compound.

TABLE 13

| Dosage of Compound A | Biofilm quantity after 24 h pre-growth and 24 h contact time, E-isomer | | Biofilm quantity after 24 h pre-growth and 24 h contact time, Z-isomer | |
|---|---|---|---|---|
| [mg/l] | Abs. at 595 nm | Biofilm reduction [%] | Abs. at 595 nm | Biofilm reduction [%] |
| 0 | 1.36 | — | — | — |
| 0.2 | 0.90 | 67.6 | 0.81 | 71.3 |
| 1 | 0.26 | 95.0 | 0.27 | 94.6 |

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

What is claimed is:

1. A method to control formation of a biofilm in an aqueous industrial manufacturing environment comprising cellulosic fibers and having a temperature of at least 40° C., the method comprising a step of continuously or periodically adminstering to the aqueous environment a composition comprising 3-[(4-methylphenyl)sulphonyl]-2-propenenitrile as an active compound wherein the aqueous industrial manufacturing environment is an aqueous environment in manufacturing paper, board, pulp, tissue, or non-woven or viscose.

2. The method of claim 1, wherein controlling formation of a biofilm comprises reducing growth of the biofilm and/or removing an existing biofilm.

3. The method according to claim 1, wherein the cellulosic fibres are lignocellulosic fibres.

4. The method of claim 1, wherein the aqueous environment comprises starch, inorganic mineral particles in form of fillers and/or paper coating materials, hemicelluloses, lignin and/or dissolved and colloidal substance.

5. The method of claim 1, wherein the composition is administered to the aqueous environment in an amount of 0.01-100 ppm of the active compound.

6. The method of claim 5, wherein the composition is administered in an amount of 0.01-10 ppm of the active compound.

7. The method according to claim 6, wherein the composition is administered in an amount of 0.01-2 ppm of the active compound.

8. The method according to claim 7, wherein the composition is administered to the aqueous environment in an amount of 0.01-1 ppm of the active compound.

9. The method according to claim 8, wherein the composition is administered in an amount of 0.01-0.5 ppm the active compound.

10. The method according to claim 9, wherein the composition is administered in an amount of 0.01-0.3 ppm of the active compound.

11. The method according to claim 1, wherein the aqueous environment comprises a residual of peroxide from about 0.01 to about 100 ppm.

12. The method according to claim 1, wherein the aqueous environment comprises a residual of active halogen in the range from about 0.01 to about 20 ppm, given as active chlorine.

13. The method according to claim 1, wherein the composition is administered periodically in the aqueous environment for 3-45 minutes for 6-24 times a day.

14. The method according to claim 13, wherein the composition is administered periodically in the aqueous environment for 10-30 minutes for 12-24 times a day.

15. The method according to claim 1, wherein the composition is added in addition to other biocidal or antimicrobial agents.

* * * * *